United States Patent [19]
Saatkamp

[11] Patent Number: 5,127,450
[45] Date of Patent: Jul. 7, 1992

[54] METHOD AND APPARATUS FOR REGULATING THE LEVEL OF A MIXTURE OF FLOWABLE MATERIAL IN A CONTAINER

[75] Inventor: Richard Saatkamp, Lengerich/Westfalen, Fed. Rep. of Germany

[73] Assignee: Windmoller & Holscher, Lengerich/Westfalen, Fed. Rep. of Germany

[21] Appl. No.: 751,577

[22] Filed: Aug. 22, 1991

Related U.S. Application Data

[63] Continuation of Ser. No. 513,497, Apr. 26, 1990, abandoned.

[30] Foreign Application Priority Data

Apr. 26, 1989 [DE] Fed. Rep. of Germany ....... 3913808

[51] Int. Cl.5 .................. G05D 9/12; G05D 11/02; B29C 31/06; B29C 31/10
[52] U.S. Cl. .......................................... 141/9; 141/83; 141/95; 141/105; 222/56; 222/132; 222/145; 366/152; 366/153; 366/156
[58] Field of Search .............. 141/1, 9, 13, 100, 83, 141/105-107, 256, 324, 94, 95, 192, 198; 366/152, 153, 156, 160, 136, 16, 18, 20, 161; 222/1, 132, 133, 135, 138, 145, 56, 63, 64; 264/211.21; 425/148, 208

[56] References Cited

U.S. PATENT DOCUMENTS

| | | | |
|---|---|---|---|
| 2,631,827 | 3/1953 | Saxe | 366/18 |
| 3,110,421 | 11/1963 | Matthias | 366/18 X |
| 3,245,584 | 4/1966 | Linville | 222/132 X |
| 3,513,700 | 5/1970 | Wiesner et al. | 222/132 X |
| 3,645,505 | 2/1972 | McLeod, Jr. et al. | 366/160 |
| 3,664,640 | 5/1972 | Morin | 366/160 |
| 3,797,702 | 3/1974 | Robertson | 366/156 X |
| 3,854,630 | 12/1974 | Standridge | 222/135 |
| 3,897,889 | 8/1975 | Hindermann | 222/145 X |
| 4,014,462 | 3/1977 | Robertson | 222/145 X |
| 4,202,466 | 5/1980 | Cook | 222/135 X |
| 4,214,859 | 7/1980 | Anders | 366/156 X |
| 4,334,784 | 6/1982 | Engels | 366/152 X |
| 4,443,109 | 4/1984 | Watts | 366/153 X |
| 4,518,262 | 5/1985 | Bornemann et al. | 366/156 |
| 4,544,279 | 10/1985 | Rudolph | 366/156 X |
| 4,548,507 | 10/1985 | Mathis et al. | 366/20 |
| 4,629,392 | 12/1986 | Campbell et al. | 141/83 X |
| 4,881,819 | 11/1989 | Blees | 366/152 X |
| 4,887,410 | 12/1989 | Gandini | 141/9 X |
| 4,938,605 | 7/1980 | Friedrich | 366/76 |
| 4,991,632 | 2/1991 | Nordmeyer et al. | 141/1 |

Primary Examiner—Henry J. Recla
Assistant Examiner—Casey Jacyna
Attorney, Agent, or Firm—Fleit, Jacobson, Cohn, Price, Holman & Stern

[57] ABSTRACT

A method of regulation of the charging of the feed hopper of an extruder with plastic granules, where it is necessary to supply the material in an amount such that the average level in the container or hopper remains constant with the least possible fluctuation despite the continual, and as a rule, uninterrupted removal of material from the container in the case of which, despite uninterrupted removal of material, the average level in the hopper or other container is maintained and is subject to the least possible fluctuation.

6 Claims, 5 Drawing Sheets

METHOD AND APPARATUS FOR REGULATING THE LEVEL OF A MIXTURE OF FLOWABLE MATERIAL IN A CONTAINER

This application is a continuation of application Ser. No. 07/513,497, filed Apr. 26, 1990 now abandoned.

FIELD OF THE INVENTION

The invention relates to a level regulating method and apparatus for flowable material, having at least two components, in a container with an outlet, and more specifically to a method of level regulation in the feed hopper of an extruder wherein the level is detected by at least one sensing device which controls the rate of addition of at least one component.

BACKGROUND OF THE INVENTION

In many mixing methods, and more especially in connection with charging the feed hopper of an extruder with plastic granules, it is necessary to supply the material in an amount such that the average level in the container or hopper remains constant with the least possible fluctuations despite the continual, and as a rule, uninterrupted removal of material from the container.

SUMMARY OF THE INVENTION

One object of the present invention is therefore to provide a method of regulation of the initially mentioned type in the case of which, despite uninterrupted removal of material, the average level in the hopper or other container is maintained and is subject to the least possible fluctuation.

In the context of a method of the initially specified type this object is attained in accordance with the invention since at least one component is supplied to the hopper or other container via a metering feed screw withdrawing such component from a special holding container, the motor of the screw being so controlled on the basis of signals of a sensing device or devices that the level in the hopper corresponds to the average level or, if there is a departure therefrom, it is again made to correspond to the average level with a minimum modification in the speed of rotation of the motor of the screw.

If the hopper or other container is supplied with at least two components by way of metering feed screws withdrawing such components from the supply container, at speeds modified to correspond to maintaining the level in the hopper or other container, the motors will run at a fixed speed ratio corresponding to the mixing ratio. This feature ensures that on the basis of the speed of rotation ratio, the mixing ratio, which is dictated by the ratio of the speeds of rotation of the motors, will remain the same even if the motors run at different speeds in order to change the level.

In order to avoid abrupt variations in the speed of rotation during the process of regulation to arrive at the mean level, the changes in speed of the motors driving the metering screws preferably takes place with an essentially constant acceleration.

In the mixing method described it may prove necessary at regular intervals to check to see that the desired mixing ratio is actually being implemented.

In order to check the precise mixing ratio of the components supplied to the hopper or other container there is therefore the further possible feature of the invention in accordance with which the components are passed into metering containers for a certain period of time. In order to be able to undertake this measuring operation the ducts extending from the metering screws to the container or to the hopper of an extruder may be provided with branch ducts leading to such metering containers and which have automatically operable slide valves thereon for shutting them off. The metering method in accordance with the invention thus makes it possible to precisely monitor the mixing ratio between a plurality of components even when the plant is operational. In this respect the metering time will be of sufficient duration but on the whole sufficiently short to ensure that the emptying of the hopper or other container taking place in the metering time or the departure from the mean level is able to be returned slowly to the mean level in accordance with the method of regulation as described without any abrupt variations in the speed of rotation.

It is preferred for the mean level to be detected by a sensor such that if there is a lowering of the level, the output signal of the sensor causes an increase in the rate of supply of the components to be mixed with a constant increase in speed while if there is a rise in the level, there will be a constant reduction in speed.

The level may be detected by a plurality of sensors, which are provided for different levels, the signals from the sensors corresponding to different speed of rotation steps of the motors of the metering screws.

In accordance with a still further advantageous form of the invention the times of the changes in level are measured between an upper datum point and a lower datum point and the speeds of rotation of the metering screws for maintaining the mean level are computed from such times.

It is furthermore convenient if the speeds of rotation of the metering screw motors are varied in a manner proportional to the speeds of the extruder screw so that modifications in the rate of removal of the material from the feed hopper owing to changed speeds of rotation of the extruder screw will not lead to a change in the mean level in the feed hopper.

In the case of the production of flat webs of thermoplastic material, the edges of extruded flat sheets are normally trimmed on both sides and the edge strips then produced as waste are supplied to a chopper and comminuted therein. The chopped edge strips are then supplied from the chopper by a blower to the feed hopper of the extruder, wherein the edge strips are mixed with the granule feed. The components of the mixture should be kept as constant as possible in regard to the ratio between them in order to be able to extrude a homogeneous composition, whose components undergo the least possible change with time.

An example of a prior art extrusion plant will now be described with reference to FIG. 1 of the drawing herein. In this plant the granules and chopped edge strips are converted into an extruded flat sheet. The feed screw of a conventional extruder 1 is driven by a drive motor 2.

The flat web 4 extruded from a slot die 3 passes over a cooling roll 5 and a bend roll 6 to a trimming device 7. The edge strips separated from the two sides of the flat web 4 or sheet pass to a chopper 9 and thence to a blower 10 and tube 11 leading back to the feed hopper of the extruder 1. As will be seen from the drawing, the hopper 12 is permanently connected with the extruder via a cylindrical neck member 13. This neck member 13 has two sensors 14 and 15 mounted on it with a spacing between then so as to respond to the level of material to be melted in the extruder. As already noted, this material includes a small fraction of chopped edge trimmings. By far the greater part of the material is in the form of granules, the granules of one material being supplied via the metering hopper 16 connected with the hopper 12, and a further type of granules being supplied via the metering hopper 17, the latter also being connected with the hopper 12. The supply is by way of metering screws 18 and 19, which are respectively driven by motors 20 and 21. There are control lines 22, 23 and 24 leading both from the main drive motor 2 and also from the motors 20 and 21 to the regulating device 25, by means of which the motors 20 and 21 are controlled in a way dependent on the drive motor 2, that is to say, if the extruder 1 is operated with a higher output rate so that the speed of the drive motor 2 is greater, the speed of the motors 20 and 21 of the metering hoppers 16 and 17 are also run at a higher speed. As already mentioned, the level in the cylindrical neck member 13 is controlled by way of sensors 14 and 15. This takes place in such a manner that, via the metering hoppers 16 and 17, granules and chopped up edge trimmings are supplied at a product rate increased above the input rate of the extruder 1 until the sensor 15 detects product. At this instant the two motors 20 and 21 of the metering hoppers 16 and 17 are turned off until the material in the neck member 13 has sunk to a height which is detected by the sensor 14. During this time chopped edge trimmings are however continuously supplied via the duct 11. This means that for a short period of time the extruder 1 will be exclusively supplied with chopped edge trimmings. The supply of this loose edging material to the extruder however leads to a pressure fluctuation in the extruder and pumping of the material. This pressure fluctuation and the pumping of the material lead to the appearance of distinct streaks in the extruded flat web.

Accordingly a still further object of the invention is to devise a method in which despite the supply of one component at substantially the same rate and of a further component at a rate varying in accordance with a predetermined level, the mixing ratio of all used components remains substantially constant over a period of time.

In order to achieve this object, in the invention at least one component is supplied substantially continuously to the container or is continuously supplied with separated edge trimmings and chopped edge strips of extruded flat film to the feed hopper of the extruder, and the added further component for mixing is regulated in accordance with the method as described above to achieve the mean level.

In this respect, in addition to the continuously supplied component or the continuously supplied edging, it is possible for one component or at least two further components to be added with a constant mixing ratio at a variable rate.

In the method in accordance with the invention the rate of supply of the at least one further component fluctuates about the mean level in such a manner that the supply rate is slightly increased when the sensor detects a level decreasing below the mean level so that the container or a part thereof is again filled at a higher rate until the level then again reaches a value exceeding the mean level. In response to a respective signal from the sensor, the supply rate is then continuously reduced so that the level again goes below the mean level and in response to a respective signal from the sensor, the supply rate is increased again. Thus the method in accordance with the invention provides for container charge regulation without the mixing ratio between the supplied components being altered to an extent which is practically relevant.

If the mixing ratio of the components added for instance to the chopped edge trimmings, it is preferred for the supply of the continuously supplied material to be interrupted during the measuring period.

BRIEF DESCRIPTION OF THE DRAWINGS

Working embodiments of the invention will now be described in detail with reference to the drawings.

DETAILED DESCRIPTION OF THE PREFERRED EMBODIMENTS

Figure 1:
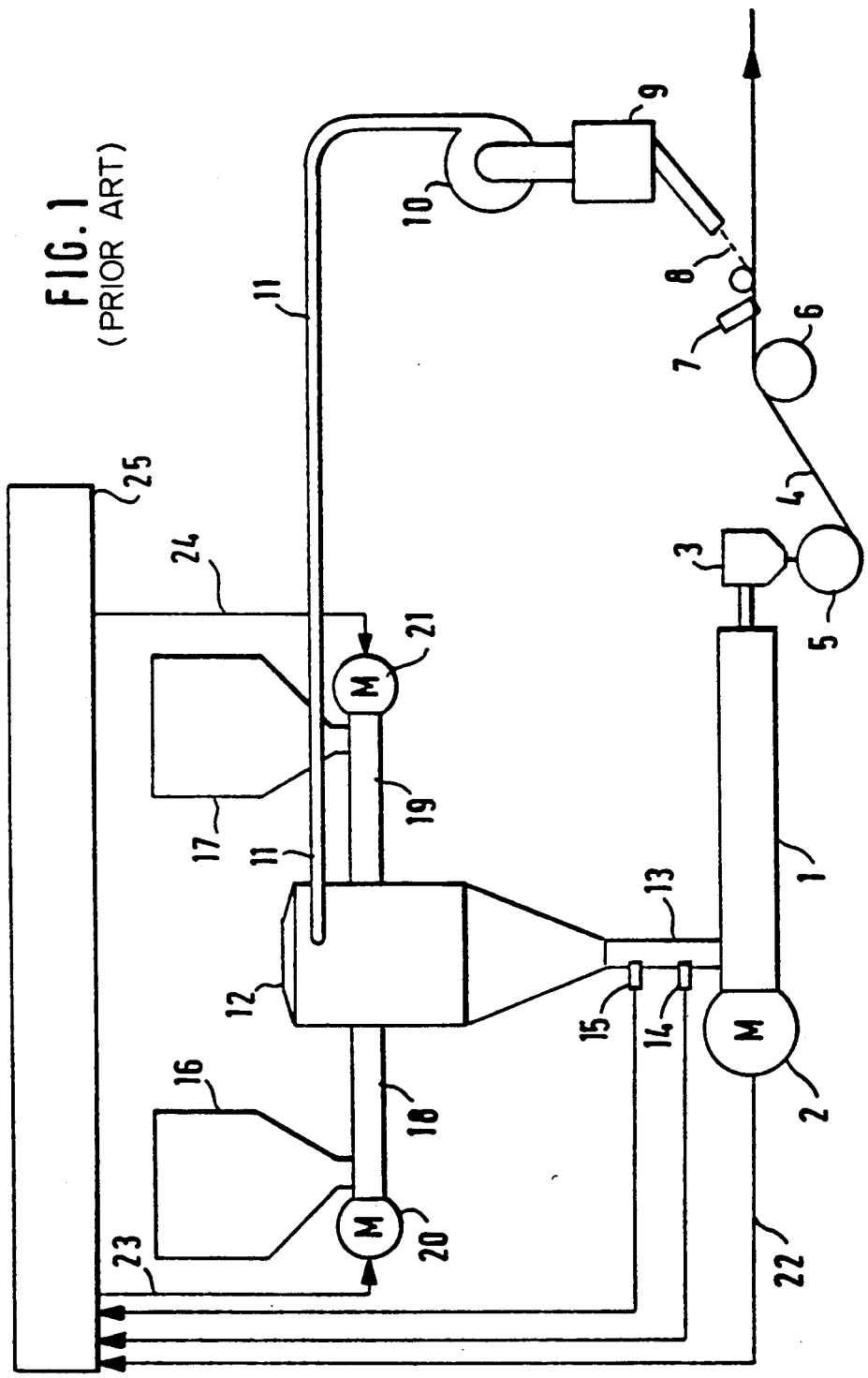
FIG. 1 is a diagrammatic view of a plant for the production of extruded flat film from thermoplastic material.
Figure 2:
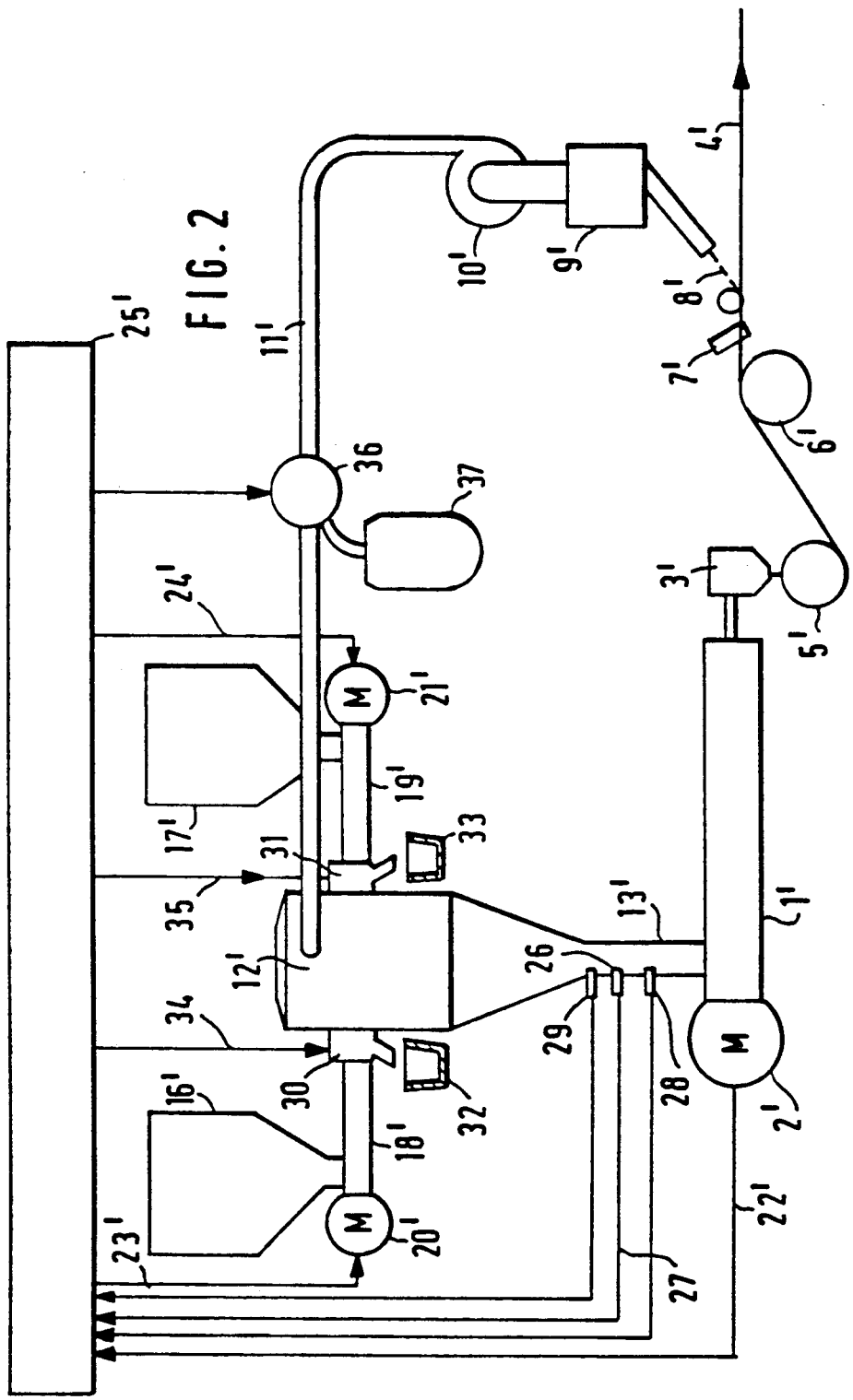
FIG. 2 is a diagrammatic view of a plant for the production of extruded flat film from thermoplastic material according to the invention.

In the plant shown in FIG. 2 the metering feed screws 18' and 19' are associated with shut off slide valves 30 and 31, which are so designed that in the closed setting thereof the granules pass to containers 32 and 33 instead of to the feed hopper 12'. These shut off slide valves 30 and 31 are operated by the regulating device 25' via control lines 34 and 35, for example in turn with an interval of two hours or, after a change of the granules, simultaneously for a period of 30 seconds so that for a time of 30 seconds the granules supplied by the metering screws 18' and 19' pass into the containers 32 and 33.

After this the operator, without having to stop the plant, may ascertain the exact rate of throughput with reference to the material in the containers 32 and 33. In order now to prevent the mixing ratio between granules and chopped edge trimmings altering during the taking of a sample, the trimmings are diverted by a two-way valve 36 and supplied for instance to a suspended bag 37 during the time in which the granules pass into the containers 32 and 33. For the purpose of taking samples it is possible to operate the regulating device 25' to cause the level of material in the cylindrical neck member 13' to rise as far as the alarm sensor 29 so that one may be sure that there is ample material in the neck member 13' to keep the extruder supplied during the taking of a sample. The sensors 26, 28 29 are so-called capacitive sensors whose sensitivity is able to be set by using a potentiometer so that the sensors only respond to the stationary column of material in the neck member 13' and not to material which is flowing or trickling into the neck member 13'.

The sensors 28 and 29 are sensors which detect the maximum and minimum allowable levels and are able to generate alarm signals. In the method described with reference to FIG. 2 the motors 20' and 21' are not switched on and off but have their speed varied in such a manner that the rate of supply from the metering screws 18' and 19' is alternately slightly increased and decreased. The filling level in the cylindrical neck member 13' fluctuates around the capacitive sensor 26. The mixing ratio of the material, which is supplied to the extruder 1', thus remains practically constant.

A further filling level regulating method will now be explained with reference to FIG. 3. Granules are fed to a main hopper 101' from two metering hoppers 102' and 103' by way of respective feed screws 104' and 105', which are driven by two motors 106' and 107'.

The main hopper 101' has a neck member 108' which is fitted with six initiators in all, which are generally referenced 109'. The granules flow in a conventional manner out of the neck member 108' into an extruder 110'. This extruder is run at an essentially constant speed of rotation. All the initiators 109' are connected with a control device 111' by way of which the speed of the motors 106' and 107' is controlled. In order for such control to be effective it is necessary for the potentiometers 112' and 113' associated with the motors 106' and 107' to be so set that the maximum speeds of the motors 106' and 107' have a ratio to each other which correspond to the mixing ratio matching the respective feed of the metering screws 104' and 105'. When this preliminary setting of the potentiometers 112' and 113' has been performed, at the beginning of operation, the neck member 108' is firstly so filled using the motors 106' and 107' that the level reaches the uppermost initiator (AUS=for turning off) so that the control device 111' completely shuts down the motors 106' and 107'. Next, as soon as the extruder 110' has withdrawn material from the neck member 108' to such an extent that the level reaches the second initiator (20%), the motors 106' and 107' are turned on so that they run with a speed which amounts to 20% of the maximum speed as set by the potentiometers 112' and 113'. If this speed is sufficient to continually supply the extruder 110' with sufficient material without the level in the neck member 108' decreasing below the second initiator (20%), the motors 106' and 107' will be run continuously at this speed. If however the level in the neck member 108' decreases still further, it will firstly reach the initiator (40%), which is the third initiator counting downwards, whereupon the speeds of the motors 106' and 107' will be increased to 40% of their maximum speed as set by the potentiometers 112' and 113'. This speed should be excessive so that the level in the neck member 108' rises again and reaches the initiator (20%) which is the second initiator counting from the top. This means, in other words, that the speeds of the motor 106' and 107' are continually either at 20, or at 40% of the maximum values as set on the potentiometers 112' and 113'. The motors 106' and 107' thus change in speed at the most by 20%. In place of six initiators it is possible to have any desired number so that the speed change steps would be still smaller. In any case, however, it necessary to ensure that at the highest speed (equal to 100% of the speeds set by the potentiometers 112' and 113') the two motors 106' and 107' continuously feed more material than may be processed by the extruder 110'.

Figure 3:
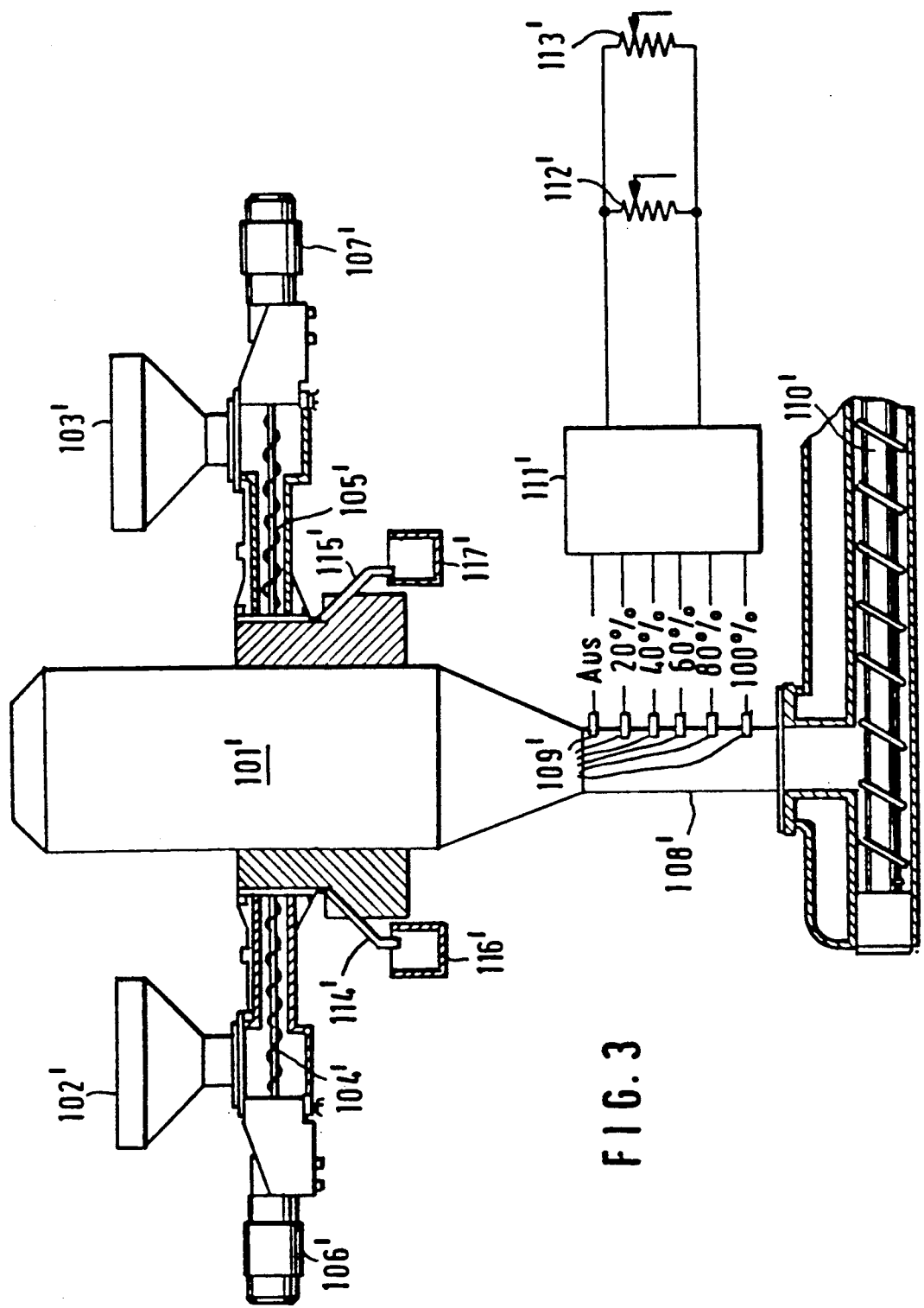
FIG. 3 is a view, generally similar to FIG. 2, relating to a modified method for regulation of the level of filling.

The reader will further see from FIG. 3 that each feed screw 104' and, respectively, 105' has an outlet 114' or 115' with two slide valves associated with these outlets 115' and 114' so that the flow of granules supplied by the feed screws 104' and 105' may be selectively supplied to the main hopper 101' or the outlets 114' and 115'. This means that during operation, the flow of granules may be diverted at predetermined or irregular intervals in such a manner that for a certain period of time they synchronously supply granules to the metering pots 116' and 117'. During this phase the mixing ratio is not affected, since the feed screws 104' and 105' continue to be operated at their speed of rotation applying at the time of taking a sample. The two granule samples taken may be used to ascertain the gravimetric mixing ratio and if such ratio is not in accord with the intended value, the ratio of the speeds of the screws 104' and 105' may be suitably adjusted using the potentiometers 112' and 113'.

Figure 4:
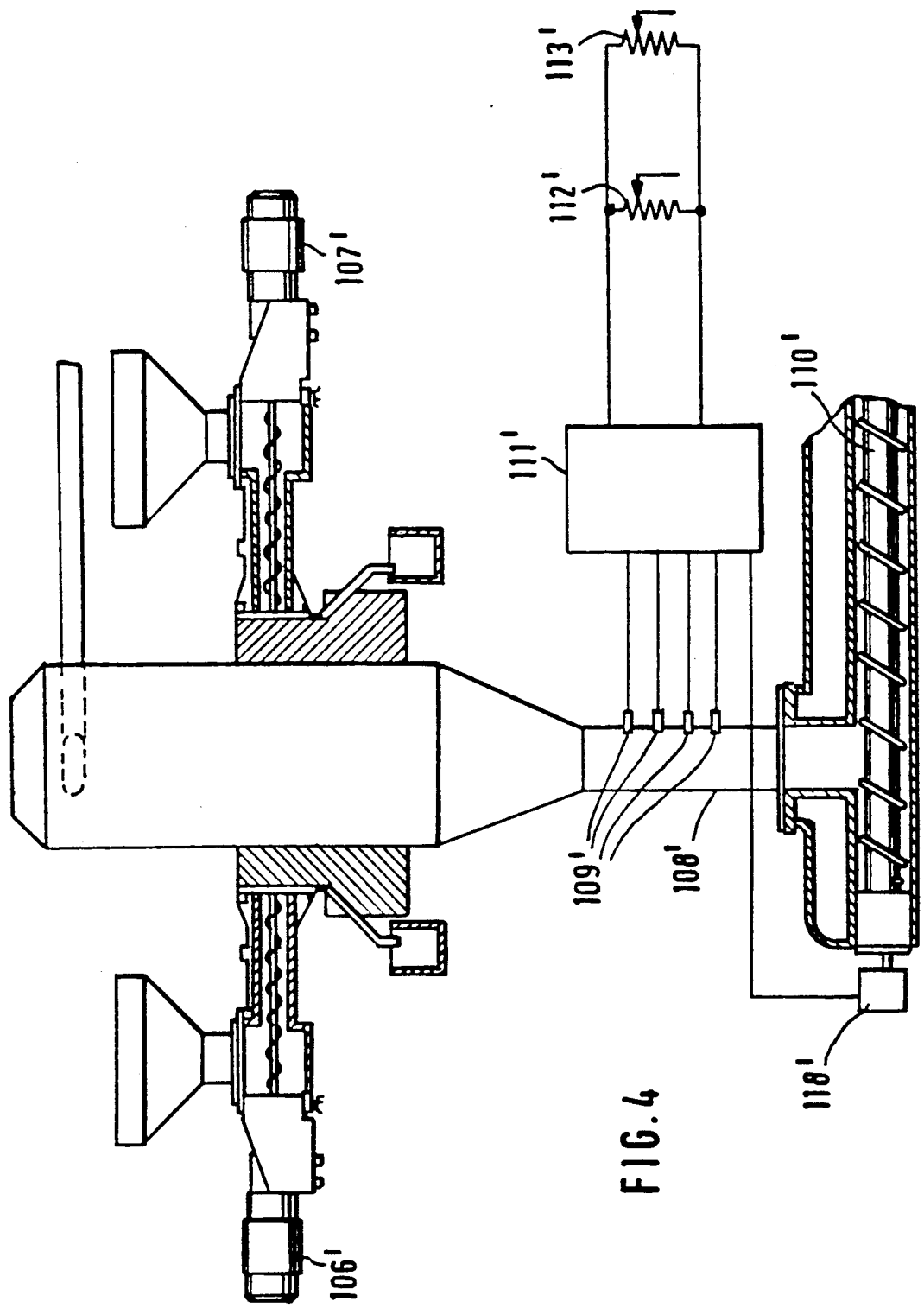
FIG. 4 is a view, generally similar to FIGS. 2 and 3, to illustrate a third method for regulating the level of filling.

During regulation of the level in the manner indicated in FIG. 3 with absolute, fixed speed steps and irrespectively of whether the extruder 110' is operating or not, FIG. 4 shows a control system in which the motors 106' and 107' are operated in a manner dependent on the speed of the extruder 110', that is to say, as soon as the extruder 110' is running, the metering screw motors 106' and 107' run as well. For this purpose a tachogenerator 118' is connected with the feed screw of the extruder 110' and with the controlling device 111'. The controlling device 111' is also connected with the four initiators 109'. By way of these initiators the speeds of the motors 106' and 107' are increased and reduced but such speed change does not always have to be in the same speed steps.

These speed steps are in fact in the working embodiment in accordance with FIG. 4 dependent on the speed of rotation at which the extruder 110' is operated. If, to take an example, the extruder 110' is only operated at 50% of its maximum speed, the metering motors 106' and 107' only have to be operated on average at 50% of their maximum speed as preset by the potentiometers 112' and 113'. This mean speed of the metering motors 106' and 107' is multiplicatively affected by the level as detected by the four initiators shown. The extruder guide value supplied to the controlling device 111' by the tachogenerator 118' is multiplied by the respective level height to give the guide value for the metering motors 106' and 107'.

Figure 5:
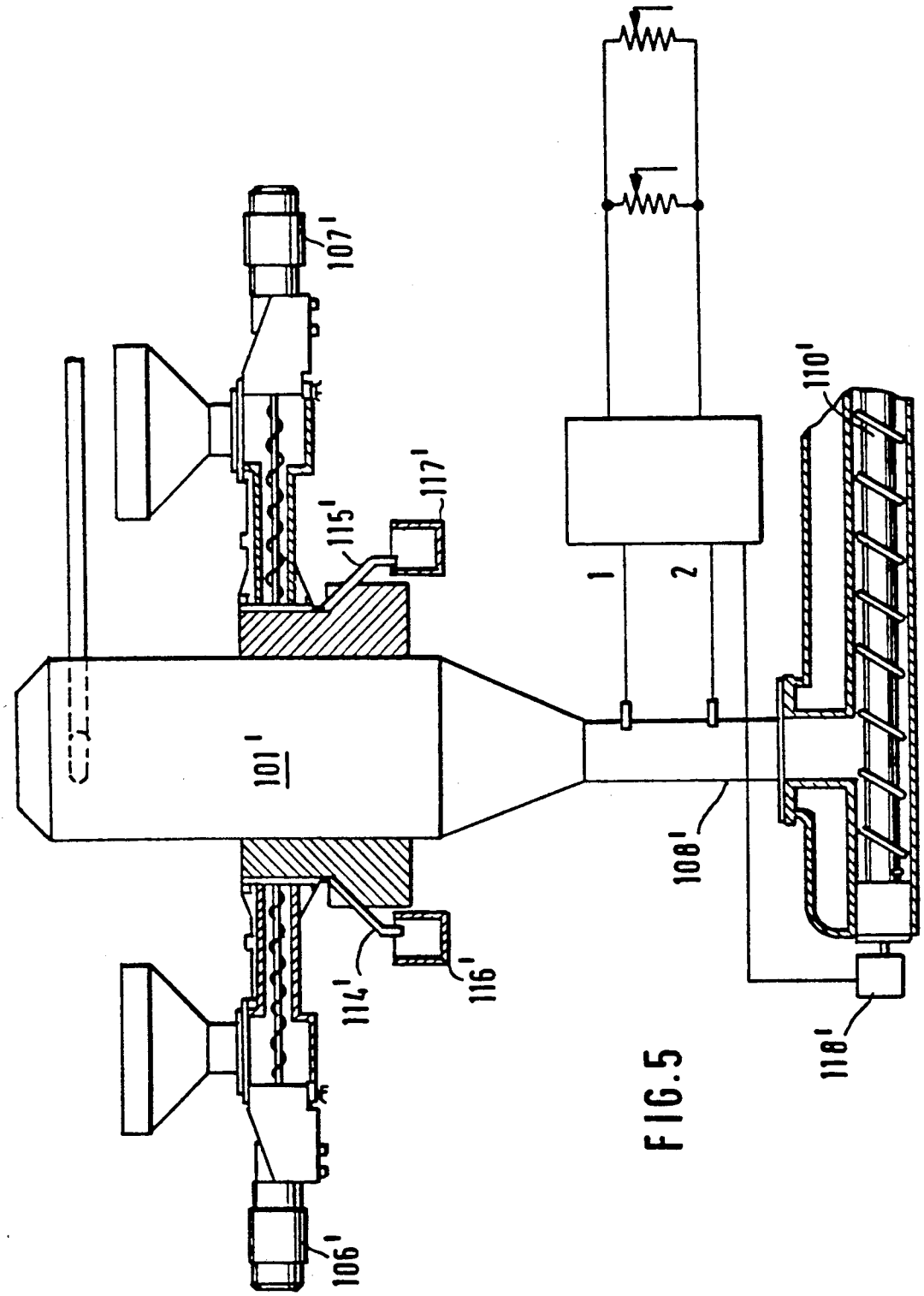
FIG. 5 is view generally similar to that of FIGS. 2 through 4, involving a fourth method for regulation of the filling level.

FIG. 5 shows a plant in which only two initiators are provided in the neck 108'. These initiators are connected with a first regulator 1, which measures the times in which the level drops once from the upper initiator to the lower initiator and a second regulator 2 measures the time taken for the level to rise from the lower initiator to the upper one. The guide feed values are altered to take these times into account and the speeds of rotation of the motors 106' and 107' are so regulated that the level of filling only sinks or goes up at a very slow pace. Accordingly there are two guide feed values, which are activated by the upper and the lower initiator respectively. In addition to this manner of regulation the speed of the extruder 110' is monitored in such a manner that if there is a sudden increase in the speed of the extruder the speed of the metering motors 106' and 107' is also increased as a percentage thereof by adaptation of the two guide feed values. This obviously applies as well in an analogous manner for an abrupt drop in the speed of rotation of the extruder 110'.

For the purpose of taking a sample, the speeds of the metering motors 106' and 107' are set permanently at the mean of the two guide feed values so that from the samples taken it is on the one hand possible to see the gravimetric mixing ratio and on the other hand the instantaneous throughput rate of the materials in question. This is possible because the taking of a sample takes place over a certain period of time and from this time and the weight of the sample taken it is possible to calculate the instantaneous throughput. The method in accordance with the invention also makes it possible to prevent variations in the mixing ratio being caused by the metering pump motors being switched on for a short time and by these motors being switched off for a short time. If for example one metering screw feeds at a rate of 330 kg per hour and the other at only 3 kg per hour, then owing to the different moments of inertia of the rotating parts, the two screws would take different times to react and this would lead to different mixing ratios. By the same token, the two screws would take different times to run up to working speed and such times would also not be without effect on the mixing ratio. Owing to the method of regulation described, such fluctuations may be avoided when the metering screws are completely halted and then started up again.

If, as indicated in the working example in accordance with FIG. 2, there is only one sensor 26 detecting the mean filling level, suitable steps will have to be taken to avoid overshoot of the levels.

In accordance with the method of the invention it is possible for the motors of the metering screws only to be subject to speed fluctuations within tight limits so that there are no sudden deviations from the mean filling level measured by sensor 26. The methods of regulation in accordance with the invention presuppose that the metering screws do not feed the components directly to the extruder but by way of buffer storage means. This buffer storage means additionally makes it possible to abstract samples from the currents of material from the metering screws without the buffer storage means becoming empty in the meantime and production then having to be interrupted.

I claim:

1. A method of regulating a mean filling level in a container provided with a removal outlet leading to an extruder of a mixture, said method comprising:
   supplying at least two base components via metering feed screws from supply containers thereof for mixing in a desired ratio in the container,
   supplying chopped edge strips substantially continuously to the container,
   detecting the level of the mixture in the container by at least one sensor,
   controlling the supply rate of at least one base component to the container from a secondary container by a metering feed screw with a motor controlled in response to signals from the at least one sensor so that the level of the mixture in the container corresponds to a mean filling level and in the event of a deviation from the mean filling level, the mean filling level is resumed with minimum changes in the speed of rotation of the motor to the metering feed screw,
   running motors of the feed screws at speeds changed in accordance with the amount of deviation from the mean filling level with a speed of rotation ratio corresponding to a constant mixing ratio at a variable rate,
   measuring a mixing ratio of the at least two base components by conducting the at least two components into a respective measuring container for a preset time,
   diverting said continuous supply of chopped edge strips from the container during conductance of the at least two components into their respective measuring containers during the preset time, and
   resuming said continuous supply of chopped edge strips to the container during other than the preset time.

2. The method as claimed in claim 1, wherein changes in the speed of rotation of the motors of the metering screws take place with substantially constant accelerations.

3. The method as claimed in claim 1, wherein the mean filling level is detected by the at least one sensor which when the mean filling level sinks, the at least one sensor provides a signal which causes an increase in the rate of supply of the at least two components to be mixed and when the lever rises, the at least one sensor causes a decrease in the rate of supply of the components to be mixed with a continuous decrease in speed of the motors of the feed screws.

4. The method as claimed in claim 1, wherein the mean filling level in the container is detected by a plurality of sensors representing different filling levels of the container, and the signals from the plurality of sensors change the speeds of the motors of the feed screws in suitable steps.

5. The method as claimed in claim 1, wherein the time of change in level between an upper and a lower level of mixture in the container and the time of change in level between a lower and an upper level of mixture in the container are measured and from such times as measured, the speeds of rotation of the motors of the metering screws are determined to maintain the mean filling level.

6. The method as claimed in claim 1, wherein the speed of rotation of the motors of the metering screws are changed proportional to a speed of rotation of a screw of an extruder screw to which the removal outlet is connected.

* * * * *